(12) United States Patent
Mannering

(10) Patent No.: US 9,868,462 B2
(45) Date of Patent: Jan. 16, 2018

(54) TORSIONAL SUSPENSIONED, STEERABLE, OSCILLATING AND PROPELLING AXLE ASSEMBLY

(71) Applicant: Shane Mannering, Buffalo, WY (US)

(72) Inventor: Shane Mannering, Buffalo, WY (US)

(73) Assignee: Shane G Mannering, Buffalo, WY (US)

( * ) Notice: Subject to any disclaimer, the term of this patent is extended or adjusted under 35 U.S.C. 154(b) by 503 days.

(21) Appl. No.: 14/575,439

(22) Filed: Dec. 18, 2014

(65) Prior Publication Data

US 2015/0183464 A1   Jul. 2, 2015

Related U.S. Application Data

(60) Provisional application No. 61/964,255, filed on Dec. 30, 2013.

(51) Int. Cl.

| B62D 55/104 | (2006.01) |
|---|---|
| B62D 55/065 | (2006.01) |
| B62D 11/20 | (2006.01) |
| B62D 55/108 | (2006.01) |
| B62D 55/084 | (2006.01) |
| B62D 55/08 | (2006.01) |
| B62D 55/10 | (2006.01) |
| B62D 55/12 | (2006.01) |
| B62D 55/15 | (2006.01) |
| B62D 7/15 | (2006.01) |

(52) U.S. Cl.
CPC ............ *B62D 11/20* (2013.01); *B62D 7/1509* (2013.01); *B62D 55/065* (2013.01); *B62D 55/08* (2013.01); *B62D 55/084* (2013.01); *B62D 55/10* (2013.01); *B62D 55/104* (2013.01); *B62D 55/108* (2013.01); *B62D 55/1083* (2013.01); *B62D 55/12* (2013.01); *B62D 55/15* (2013.01)

(58) Field of Classification Search
CPC .... B62D 55/02; B62D 55/065; B62D 55/104; B62D 55/30; B62D 55/1083; B62D 55/12; B62D 55/15; B62D 55/10; B62D 11/20; B62D 7/1509; B62D 55/24; B62D 55/08; B62D 55/084; B62D 55/108
See application file for complete search history.

(56) References Cited

U.S. PATENT DOCUMENTS

| 3,792,745 A * | 2/1974 | Files | B62D 11/20 180/415 |
|---|---|---|---|
| 4,029,165 A * | 6/1977 | Miller | B62D 11/20 180/6.48 |
| 4,387,814 A * | 6/1983 | Beduhn | B66C 23/62 180/9.46 |
| 4,579,182 A * | 4/1986 | Dewing | B62D 11/20 180/9.46 |
| 5,607,210 A * | 3/1997 | Brazier | B62D 55/04 305/131 |
| 6,006,847 A * | 12/1999 | Knight | B62D 55/04 180/9.25 |

(Continued)

*Primary Examiner* — Joseph M Rocca
*Assistant Examiner* — Daniel S Yeagley

(57) ABSTRACT

A "Torsional Suspensioned, Steerable, Oscillating and Propelling Axle Assembly" utilized in the individual track units of a multi track unit all-terrain vehicle or machine with axle assemblies providing/enabling suspension, steering, oscillation and propelling functions of the track units of the all-terrain vehicle or machine.

6 Claims, 4 Drawing Sheets

(56) References Cited

U.S. PATENT DOCUMENTS

| | | | | |
|---|---|---|---|---|
| 6,095,275 | A * | 8/2000 | Shaw | B62K 13/00 180/185 |
| 6,176,334 | B1 * | 1/2001 | Lorenzen | B62D 21/14 180/9.46 |
| 6,334,496 | B1 * | 1/2002 | Hiraki | B62D 55/02 180/9.5 |
| 6,640,915 | B2 * | 11/2003 | Haringer | A01B 51/026 180/6.24 |
| 8,851,209 | B2 * | 10/2014 | Fukumoto | B62D 55/02 180/9.21 |
| 2005/0061557 | A1 * | 3/2005 | Brazier | A01G 25/09 180/9.21 |
| 2007/0240917 | A1 * | 10/2007 | Duceppe | B62D 15/00 180/9.21 |
| 2008/0011524 | A1 * | 1/2008 | Despres | B62D 55/108 180/9.21 |
| 2008/0196947 | A1 * | 8/2008 | Brazier | B60G 21/04 180/9.5 |
| 2010/0139994 | A1 * | 6/2010 | Hansen | B62D 55/04 180/9.26 |
| 2015/0101872 | A1 * | 4/2015 | Girouard | F16D 55/22 180/9.42 |

\* cited by examiner

TORSIONAL SUSPENSIONED, STEERABLE, OSCILLATING AND PROPELLING AXLE ASSEMBLY

CROSS REFERENCE TO RELATED APPLICATIONS

The present Non-Provisional patent application claims the benefits of priority of U.S. Provisional Patent application 61/964,255 entitled "Torsional Suspensioned, Steerable, Oscillating, and Propelling Axle Assembly". Confirmation #3920 Provisional Patent filing date: Dec. 30, 2013

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

Field of Endeavor

The present invention relates to all-terrain tracked vehicles or machines and more particularly to providing/enabling the suspension, steering, oscillating and propelling functions of all-terrain vehicles or machines.

All-terrain vehicles or machines used for over snow travel or on soft underfoot soil conditions utilizing tracks either endless or spliced are commonly of the four or two track configuration.

All-terrain vehicles and machines are configured with tracks for the purpose of traveling where vehicles and machines equipped with tires are unable to travel.

Typically tracked all-terrain vehicles or machines are used for but not limited to, remote cabin access, mineral exploration, personnel and equipment transport, search and rescue missions, back country skiing, hunting and fishing excursions, utility maintenance, snow grooming or agricultural uses.

On some past and current four track vehicles, propelling is achieved via automotive axles, mounted fore and aft of the machine, similar to a four wheel drive automotive configuration. Sprockets or hubs mounted to the automotive axles where normally a wheel and tire would mount drive the tracks to propel the vehicle. These automotive axles are mounted to leaf springs for suspension of the vehicle.

Leaf sprung automotive axle configurations do not allow for true independent suspension as the automotive axle is one complete housing where should one side of the axle rise or fall due to variances in terrain, the other side of the axle would also be effected by this movement opposingly rising or falling, negatively effecting fraction and propulsion, also negatively effecting operator and occupant ride quality and comfort.

The automotive axles being mounted to leaf springs are attached to turntables with which a hydraulic ram or linkage is attached and either extended or retracted, thereby rotating the turntables to achieve turning of the vehicle. This suspension, steering configuration has many component wear points, increased component weight, lacks severely in overall durability and being that many of the components are unique to the vehicle, component maintenance, repair or replacement cost is extremely high.

Some past and current four track vehicles utilize tilting automotive axle assemblies that tend to slingshot the operator/occupants side to side when encountering rough or adverse terrain.

Yet on other four track machines, steering is achieved by articulating fore and aft frame assemblies with hydraulic rams and linkages, with propelling being achieved via remote mounted hydraulic drive motors. This type of four track machine typically has little or no suspension, very high frame and undercarriage stress, decreased ride quality and comfort and again very high component wear, weight, repair or replacement cost.

Some ATV, UTV or automotive vehicles are utilized with track units in place of tires for over snow or soft underfoot soil travel. These ATV, UTV and automotive vehicles utilize A-arm suspensions. These suspensions work well for tire/wheel applications where leverage stresses are low but with the extended force and leverage that a track unit can exert on A-arm suspensions, life expectancy of these components is significantly reduced and component wear, repair or replacement cost is significantly higher.

Because A-arm suspensions lack in durability from the increased leverage of a track unit, the size of track used has to be significantly decreased which increases ground pressure and reduces the ability of all-terrain vehicles or machines to travel over snow or in soft underfoot soil conditions.

Some past and current two track machines utilize torsion axles for individual idler or load wheel suspension but are not in direct assembly with steering, oscillation or propelling functions.

Also past and current two track machines do not have the ability to oscillate the track units and typically will "porpoise" over rough and adverse terrain creating high stresses on the overall vehicle, loss of traction and discomfort for operators and occupants.

Still other current and past two track machines utilize remote mounted hydraulic drive motors with attached driven sprockets or driven hubs. These drive motors are opposingly driven or driven at different speeds hydraulically to achieve steering but are separate of suspension and oscillating functions.

While other two track machines utilize a differential with internal or external brake bands, disc brakes and/or planetaries where one band, disc or planetary connected via axles, to the left or right sprocket or hub is stopped or slowed to achieve steering.

Because steering, suspension and propelling on the prior mentioned designs are achieved separately, these designs increase the amount of components needed thereby adding considerable weight to the machine, increasing the machine ground pressure therefore decreasing the machine's ability to travel over snow or in soft underfoot soil conditions.

With the increased amount of components comes increased weight, component wear, repair or replacement cost. Again with the many unique components of prior mentioned designs, limited availability and increased cost of components is also common.

Because of erratic movements and at times the complete stopping of one track, resultant of the two tracked vehicle's steering configuration, two tracked vehicles typically will dig themselves down into the snow or soft underfoot soil while turning, often resulting in the vehicle becoming stuck and unable to travel.

SUMMARY OF THE INVENTION

A general object of this invention is to provide an axle assembly which provides/enables suspension, steering, oscillation and propelling functions of an all-terrain vehicle or machine with:
a.) a much stronger, less complex and compact design
b.) considerably less maintenance and cost
c.) fewer components and less weight
d.) lower ground pressure and less ground disturbance from the vehicle or machine
e.) enabling multiple steering configurations dependent upon terrain encountered
f.) greater control of the all-terrain vehicle or machine over adverse or rough terrain Another object of the invention is to provide true independent suspension of each individual track unit, whereas leaf sprung automotive axles do not.

One advantage of the invention, being extremely robust and less complex than all-terrain vehicles or machines utilizing a-arm suspensions, the invention enables the use of much larger tracks which significantly decrease ground pressure and disturbance resulting in superior over snow and soft underfoot soil condition travel.

Another advantage of the invention is that the majority of components that make up the invention are typically common, readily available and very economical, whereas the components of other past and current tracked all-terrain vehicles and machines are unique to those vehicles or machines resulting in limited availability with very high repair or replacement cost.

Yet another advantage is that the invention allows each individual track unit to oscillate over varying, adverse and rough terrain.

All-terrain vehicles and machines utilizing this invention achieve considerably better traction, less impact and shock loads on the all-terrain vehicle and machine components, with significant improvement in operator/occupant ride quality and comfort.

Still another advantage of this invention is that it can be used for both the front and rear track units of the all-terrain vehicle or machine thus providing steering both front and rear, allowing for smoother and tighter turns, whereas a-arm equipped vehicles or machines typically have only front steering.

Since this invention provides and enables the suspension, steering, oscillation and propelling of the track units individually, overall stresses against the main structures such as the frames and cabs of the all-terrain vehicle or machine is considerably less than on past and current vehicles or machines that utilize tilting, rotating turntables with leaf sprung solid axles or machines utilizing fore and aft articulating frame assemblies.

BRIEF DESCRIPTION OF THE SEVERAL VIEWS OF THE DRAWING

FIG. 5 is a perspective view of torsion assembly 25 and vertical bearing cylinder 21. Right side configuration shown.

DETAILED DESCRIPTION OF THE INVENTION

The following use of, or reference to, "invention" and/or "axle assembly 9", pertains directly to the "Torsional Suspensioned, Steerable, Oscillating and Propelling Axle Assembly.

It is to be understood that the following details of construction and the arrangement of components in no way limit the scope of the invention. Those skilled in the art will appreciate that other aspects, objects, and advantages of the invention can be obtained from a study of the detailed description, drawings and claims. It is also to be understood that the phraseology and terminology used herein, is for the purpose of description and should not be regarded as limiting.

Figure 1:
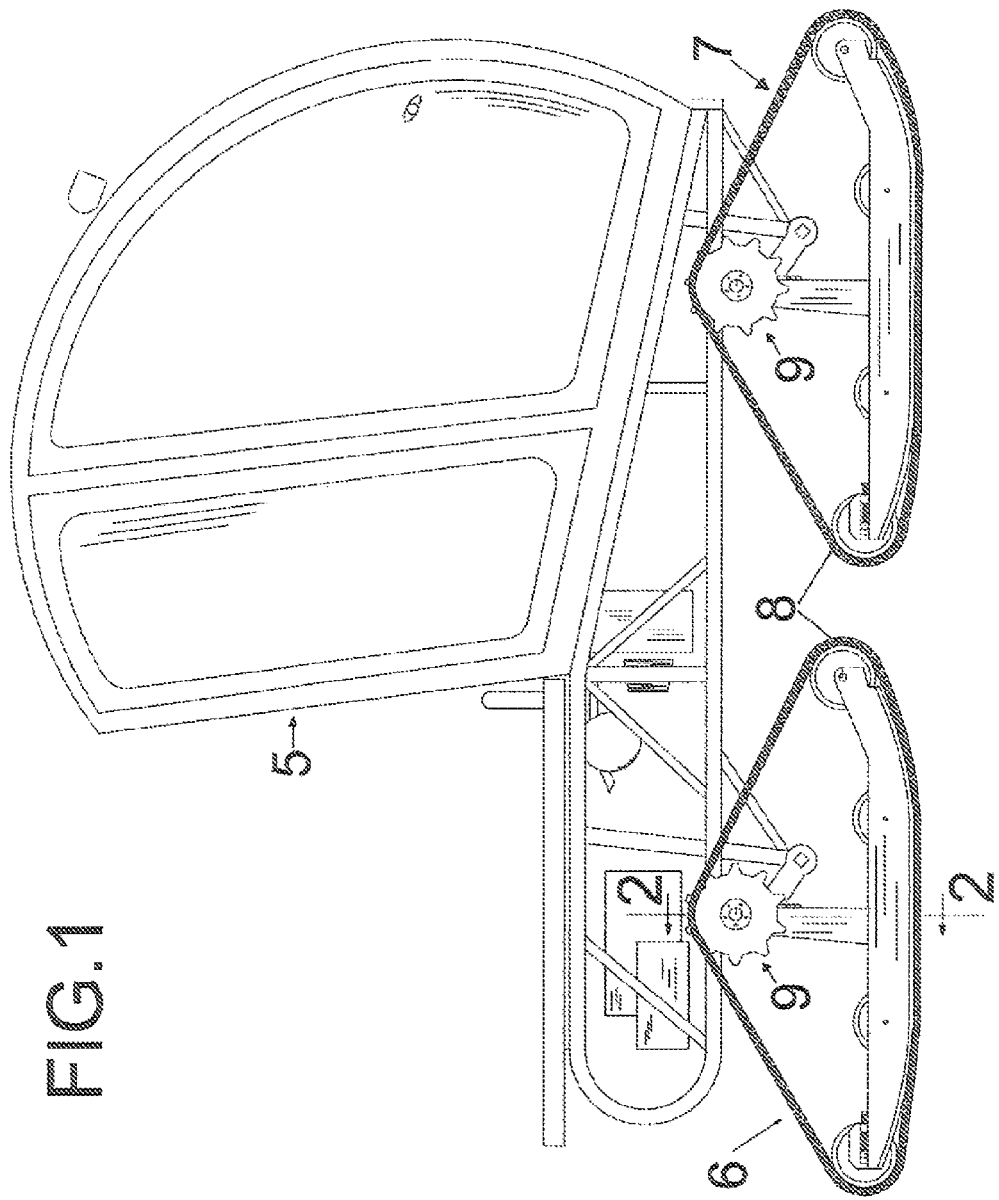
FIG. 1 is a right side elevation view of a four track all-terrain vehicle with each track unit utilizing a "Torsional Suspensioned, Steerable, Oscillating, and Propelling Axle Assembly". The right side track units are only shown.

Referring to FIG. 1 illustrating a side view of four tracked, all-terrain vehicle 5. All-terrain vehicle 5 is typically, but not limited to use in snow, soft underfoot soil and/or adverse terrain conditions. All-terrain vehicle 5 is supported by four individual track units, similarly configured to an automotive wheeled configuration. Operators and passengers also occupy all-terrain vehicle 5 similarly to an automotive configuration.

All-terrain vehicle 5 is powered by differentials, a transmission and engine (not shown) in a well known manner.

Although not shown, all-terrain vehicle 5 is capable of utilizing but not limited to various implement attachments both on the front and back of the vehicle such as plows, groomers and sprayers used in agriculture, forestry, military, commercial, residential, snow grooming or other applications.

Right rear track unit 6 and right front track unit 7 are only shown. Track units 6 & 7 are shown utilizing axle assembly 9 and tracks 8, thus providing/enabling suspension, steering, oscillation and propelling functions for all-terrain vehicle 5.

With axle assembly 9 being used in both the front and rear track units, again right rear track unit 6 and right front track unit 7 only shown, steering of both front and rear track units is possible.

Axle assembly 9 used in the front and rear track units allow for different steering configurations based on operator input and terrain encountered.

Dependent upon operator input, axle assembly 9 enables front steering only, rear steering only, front and rear steering synchronized or front and rear steering opposing steering configurations, enhancing control over adverse and varying terrain.

Tracks 8 may have many different heights, widths and terrain engaging profiles to provide the most optimum traction, travel and efficiency for all-terrain vehicle 5, dependent upon terrain conditions and applications.

Figure 2:
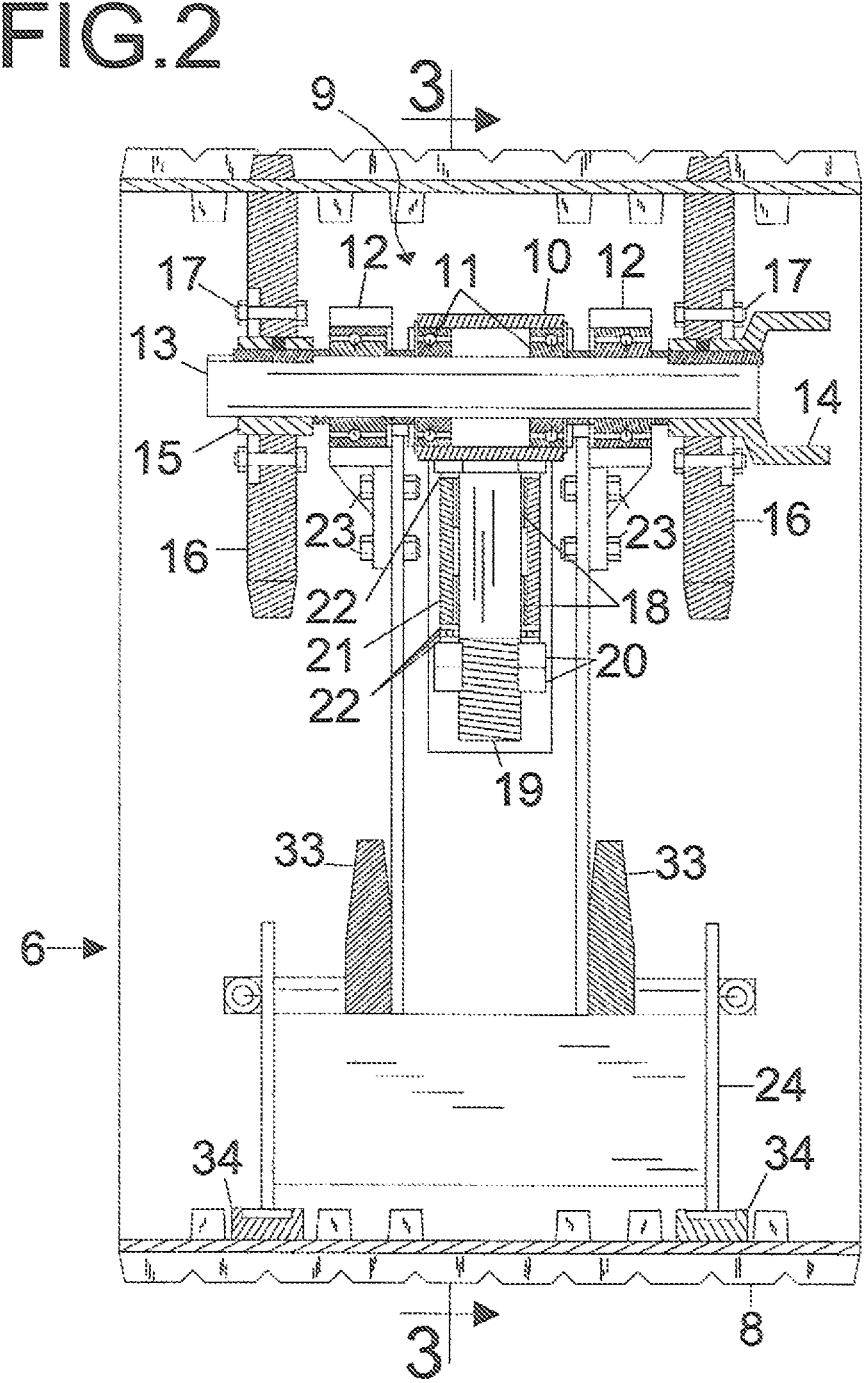
FIG. 2 is an enlarged cross sectional view of right rear track unit 6, with axle assembly 9, taken generally along the line 2-2 in FIG. 1.

Referring to FIG. 2 illustrating a cross sectional view of right rear track unit 6 with axle assembly 9 of a preferred embodiment shown in greater detail.

Invention 9 is mounted to track frame 24 via horizontal driven shaft 13, flange track frame bearings 12 and fasteners 23. Flange track frame bearings 12 have set screws for aligning and securing horizontal driven shaft 13 in position.

Flange track frame bearings 12 allow oscillation of the track units supporting all-terrain vehicle 5 (FIG. 1). Oscillation of the track units allow the tracks 8 to stay in direct contact with adverse or varying terrain, increasing traction and steering capabilities.

A driveshaft receiving power from a differential, transmission and engine (not shown) in a well known manner rotates drive yoke 14. Drive yoke 14 and chive hub 15 have flanges for mounting track drive elements being either sprockets 16 (FIG. 3) or driven hubs 32 (FIG. 4) using fasteners 17.

Drive yoke 14 is mounted to the inner end of horizontal driven shaft 13, while drive hub 15 is mounted to the outer end of horizontal driven shaft 13. In the preferred embodiment drive yoke 14 and drive hub 15 have set screws for securing to horizontal driven shaft 13.

With rotational power applied to drive yoke 14, which rotates horizontal driven shaft 13 and drive hub 15, track drive elements sprockets 16 (FIG. 3) or driven hubs 32 (FIG. 4) engaging open windows and/or inner lugs in track 8, propel all-terrain vehicle 5 (FIG. 1).

The track drive elements being either sprockets 16 (FIG. 3) or driven hubs 32 (FIG. 4) can have many different profiles, tooth counts, and/or hub configurations for driving tracks 8, dependent upon application.

Horizontal driven shaft 13 is keyed to engage drive yoke 14 and drive hub 15 which are also keyed using key stock for engagement. Horizontal driven shaft 13, drive yoke 14 and drive hub 15 can have many engaging profiles including but not limited to keyed, splined, hexagonal or can also be permanently affixed.

Horizontal driven shaft 13 rotates through insert bearings 11. Insert bearings 11 are installed in horizontal bearing cylinder 10 which provides support and guidance of horizontal driven shaft 13.

Insert bearings 11 also have set screws for aligning and securing horizontal driven shaft 13 in position.

Horizontal bearing cylinder 10 is in assembly perpendicularly with steering shaft 19. Steering shaft 19 rotates through vertical bearings 18.

Steering shaft 19 is retained by retainers 20. Retainers 20 also provide proper bearing preload of thrust bearings 22.

Vertical bearings 18 install inside vertical bearing cylinder 21 which provides support and guidance of steering shaft 19. Thrust bearings 22 and vertical bearings 18 provide smooth rotation of steering shaft 19 to rotate track frame 24 in desired direction.

Bogie wheels 33 and guides 34 provide guidance, support and friction reduction of track 8.

Figure 3:
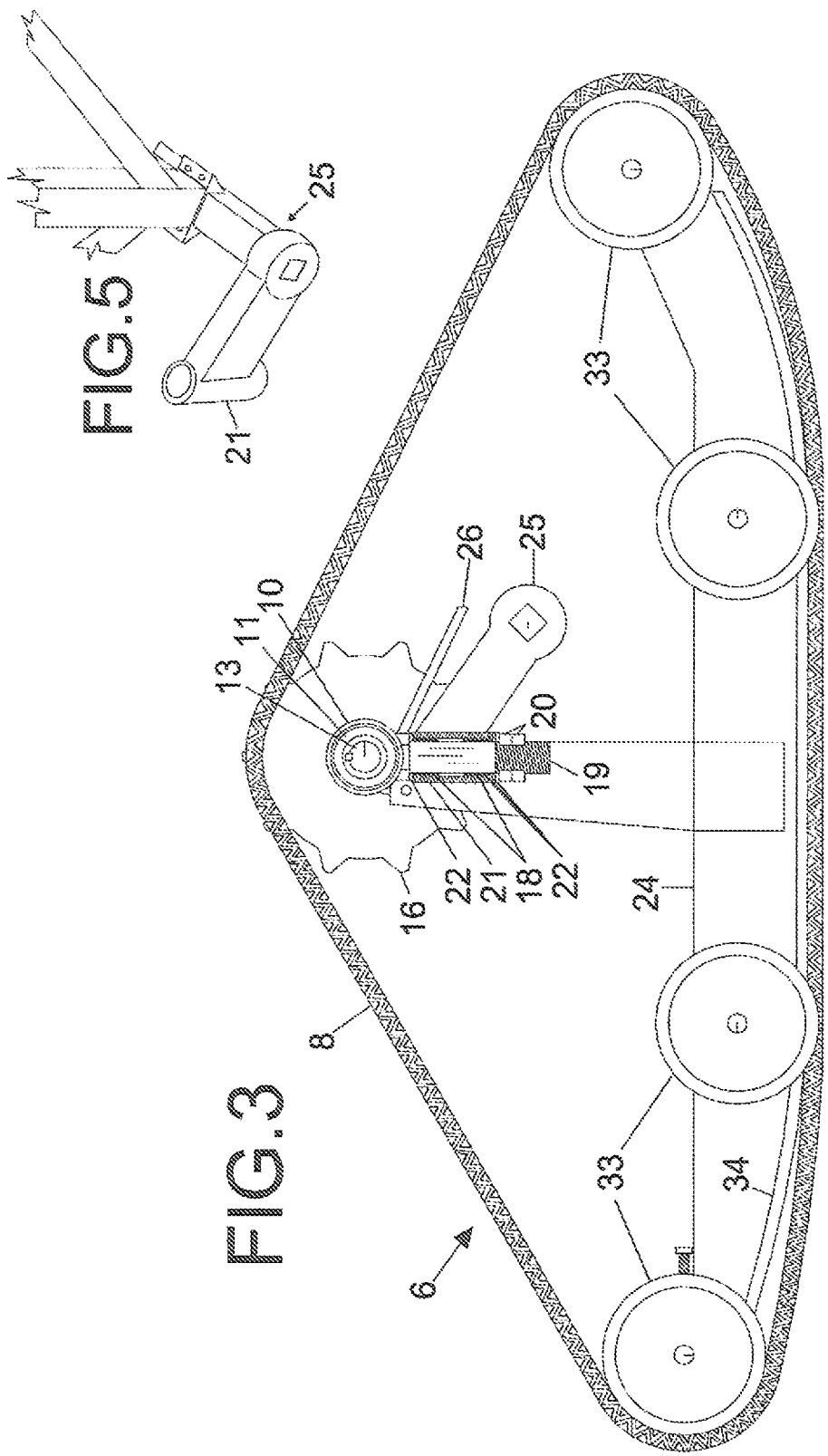
FIG. 3 is a full cross sectional view of right rear track unit 6 (FIG. 1), with axle assembly 9, taken generally along the line 3-3 of cross sectional view of track unit 6 in FIG. 2.

Referring to FIG. 3, illustrating a full cross sectional view of right rear track unit 6, with axle assembly 9 of a preferred embodiment showing steering arm 26 also being in assembly with steering shaft 19 and horizontal bearing cylinder 10.

When linear force is applied to steering arm 26, steering shaft 19 and horizontal bearing cylinder 10 rotate which in turn rotates the track unit to provide steering for all-terrain vehicle 5 (FIG. 1).

Vertical bearing cylinder 21 is in assembly with torsion assembly 25. Torsion assembly 25 mounts to the frame of all-terrain vehicle 5 (FIG. 1) and provides independent suspension in a well known manner.

Torsion assembly 25 provides independent suspension for the individual track unit also contributing to keeping track unit in direct contact with terrain encountered, increasing traction and traveling ability of all-terrain vehicle 5 (FIG. 1).

Figure 4:
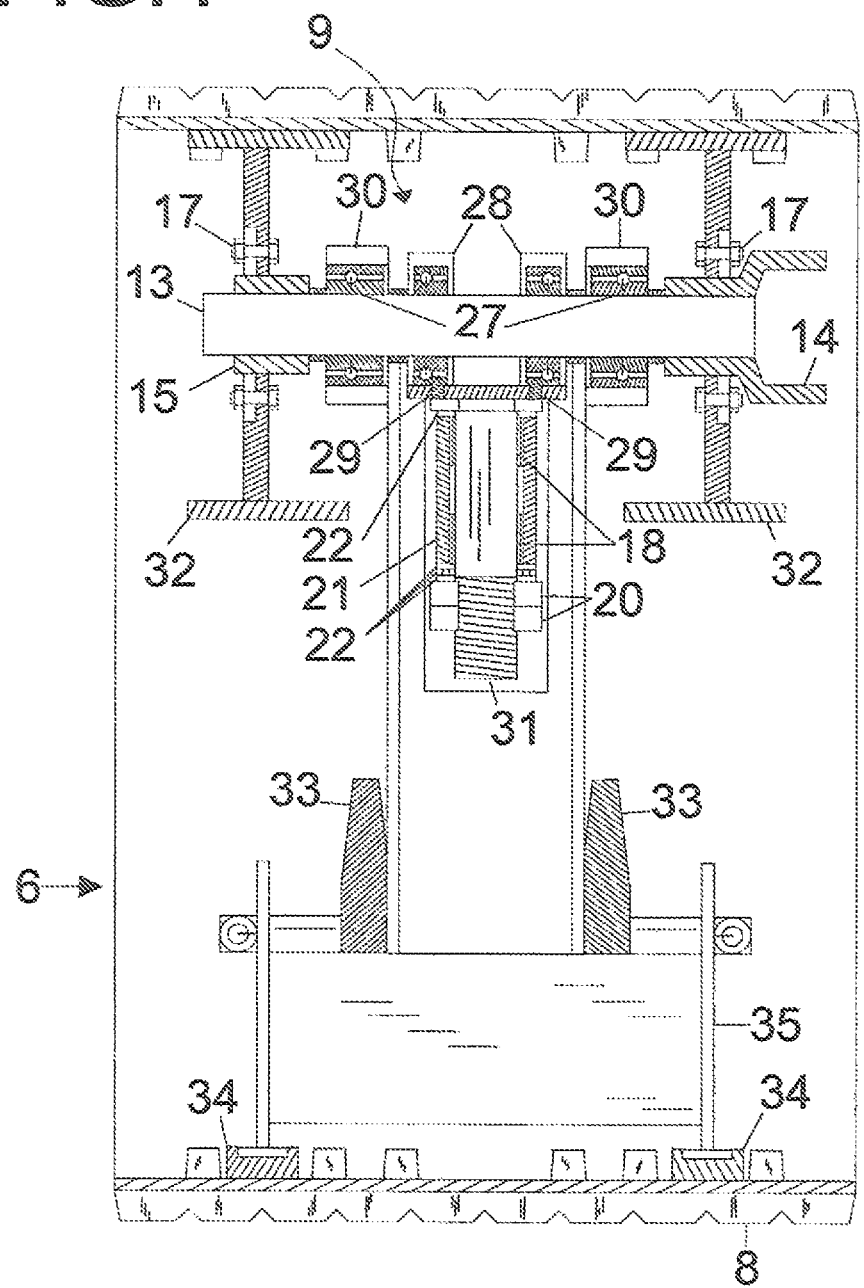
FIG. 4 is a similar view of FIG. 2 showing an alternate preferred embodiment of bearing, steering shaft, track drive element and track frame configuration providing similar functions as preferred embodiment in FIG. 2.

Referring to FIG. 4 Illustrating a similar, alternate preferred embodiment view of FIG. 2 with flanged steering shaft 31 as an alternate preferred embodiment of steering shaft 19 (FIG. 2).

Pillow block bearings 28 are an alternate preferred embodiment of insert bearings 11 (FIG. 2) and horizontal bearing cylinder 10 (FIG. 2). Pillow block bearings 28 are attached to flanged steering shaft 31 by fasteners 29. Pillow block bearings 28 have set screws for aligning and securing horizontal driven shaft 13 in position.

Driven hubs 32 are an alternate preferred embodiment of sprockets 16 (FIG. 2).

Track frame insert bearings 27 are an alternate preferred embodiment of flange track frame bearings 12 (FIG. 2).

Track frame insert bearings 27 install in track frame bores 30 of alternate configured track frame 35 thus connecting axle assembly 9 to track frame 35 via horizontal driven shaft 13 while also allowing oscillation of the track unit. Track frame insert bearings 27 have set screws for aligning and securing horizontal driven shaft 13 in position.

In the preferred embodiment, drive yoke 14 is of a u-joint configuration. Although not shown, an alternate preferred embodiment would be the drive yoke of a cv-joint configuration.

Referring to FIG. 5 illustrating a perspective view of torsion assembly 25 and vertical bearing cylinder 21. Torsion assembly 25 has a right and left machine side configuration. Right side configuration is shown.

The invention claimed is:

1. An axle assembly for an all-terrain vehicle or a machine comprising:

a torsion assembly that mounts to a frame of the all-terrain vehicle or the machine providing independent suspension of an individual track unit;

a vertical bearing cylinder providing support and guidance of a steering shaft;

vertical bearings that install in the vertical bearing cylinder providing smooth rotation of the steering shaft;

thrust bearings installed at upper and lower ends of the vertical bearing cylinder contributing to smooth rotation of the steering shaft;

a steering arm that receives linear actuation to rotate the steering shaft;

the steering shaft receiving rotational force from the steering arm to rotate the track unit left or right for turning of the all-terrain vehicle or the machine;

retainers that provide proper thrust bearing preload and retaining of the steering shaft;

a horizontal bearing cylinder providing support and guidance of a horizontal driven shaft;

insert bearings that install in the horizontal bearing cylinder providing smooth rotation of the horizontal driven shaft;

flange track frame bearings that connect a track frame to the axle assembly via the horizontal driven shaft and flange bearing fasteners with the flange track frame bearings also allowing the track frame to oscillate on the horizontal driven shaft;

the horizontal driven shaft keyed for engaging a keyed drive yoke and a drive hub;

the drive yoke being keyed that mounts to an inner end of the horizontal driven shaft with the drive yoke having a flange for mounting a track drive element;

the drive hub being keyed that mounts to an outer end of the horizontal driven shaft with the drive hub having a flange for mounting the track drive element.

2. The axle assembly of claim 1, wherein the all-terrain vehicle or the machine comprising:
   multiple axle assemblies configured as torsional suspensioned, steerable, oscillating and propelling axle assemblies.

3. The axle assembly of claim 1 wherein the torsion assembly and the vertical bearing cylinder are an assembly.

4. The axle assembly of claim 1 wherein the steering arm, the steering shall and the horizontal bearing cylinder are an assembly.

5. The axle assembly of claim 1 wherein the insert bearings and the flange track frame bearings align and secure the horizontal driven shaft in position.

6. The axle assembly of claim 1 wherein the drive yoke receives a rotational force to rotate the horizontal driven shaft.

\* \* \* \* \*